US012452641B2

United States Patent
Mohan Raj et al.

(10) Patent No.: US 12,452,641 B2
(45) Date of Patent: Oct. 21, 2025

(54) DATA NETWORK NAME REPLACEMENT FOR ROAMING SUBSCRIBERS

(71) Applicant: Oracle International Corporation, Redwood City, CA (US)

(72) Inventors: John Mohan Raj, Bangalore (IN); Geeta Mohanty, Bangalore (IN); Rajiv Krishan, Cary, NC (US); Uri Baniel, Buffalo Grove, IL (US)

(73) Assignee: Oracle International Corporation, Redwood City, CA (US)

( * ) Notice: Subject to any disclaimer, the term of this patent is extended or adjusted under 35 U.S.C. 154(b) by 370 days.

(21) Appl. No.: 18/307,540

(22) Filed: Apr. 26, 2023

(65) Prior Publication Data

US 2024/0365102 A1   Oct. 31, 2024

(51) Int. Cl.
*H04W 8/02* (2009.01)
*H04W 8/26* (2009.01)

(52) U.S. Cl.
CPC .............. *H04W 8/02* (2013.01); *H04W 8/26* (2013.01)

(58) Field of Classification Search
CPC ..... H04W 48/18; H04W 60/00; H04W 76/10; H04W 12/06; H04W 12/08; H04W 40/246; H04W 12/10; H04W 8/02; H04W 8/26
See application file for complete search history.

(56) References Cited

U.S. PATENT DOCUMENTS

| | | | |
|---|---|---|---|
| 2020/0252285 A1* | 8/2020 | Hietalahti | H04L 41/0866 |
| 2020/0404739 A1* | 12/2020 | Thiebaut | H04L 12/185 |
| 2022/0022027 A1* | 1/2022 | Xin | H04W 8/12 |
| 2022/0141662 A1* | 5/2022 | Liao | H04W 12/08 726/1 |
| 2023/0247548 A1* | 8/2023 | Qiao | H04W 52/0219 370/311 |
| 2023/0397097 A1* | 12/2023 | Yu | H04W 8/20 |
| 2024/0137855 A1* | 4/2024 | Adjakple | H04L 45/306 |
| 2024/0187968 A1* | 6/2024 | Tiwari | H04W 8/20 |
| 2024/0298253 A1* | 9/2024 | Talebi Fard | H04W 48/18 |
| 2025/0016711 A1* | 1/2025 | Tiwari | H04W 8/12 |

FOREIGN PATENT DOCUMENTS

WO   WO-2023058009 A1 *   4/2023   .............. H04W 4/90

OTHER PUBLICATIONS

3GPP TS 23.503 version 16.8.0 Release 16 (Apr. 2021) (Year: 2021).*

* cited by examiner

*Primary Examiner* — Dung Hong

(57) ABSTRACT

Various embodiments of the present technology generally relate to systems and methods for controlling data network name (DNN) or access point name (APN) replacement for roaming mobile subscribers at the home network. A security edge protection proxy (SEPP) system may receive a request from a visited network regarding a roaming user equipment (UE) associated with a home network of the SEPP system, determine a local data network name (DNN) compatible with the home network to associate with the UE, add the local DNN to the request, and forward the request to a destination within the home network.

20 Claims, 6 Drawing Sheets

DATA NETWORK NAME REPLACEMENT FOR ROAMING SUBSCRIBERS

TECHNICAL FIELD

Various embodiments of the present technology generally relate to management of roaming subscribers within a network, such as fifth generation (5G) communications networks. More specifically, embodiments of the present technology relate to systems and methods for improved data network name (DNN) replacement for roaming devices.

BACKGROUND

Communications networks can be used to connect remote systems and devices, allowing for distributed and efficient processing, resource use, and intercommunication. User equipment (UE) can connect to a communications network through a network service provider or network operator. A UE or its associated user may subscribe to a particular network operator, which may provide communication service, network infrastructure, or both, within a designated region or area, which may be referred to as a home network. If the subscriber leaves the area of the home network, their UE may still be able to connect to a visited network as a roaming user. The visited network may communicate with the roaming subscriber's home network to manage service, billing, or other aspects of the roaming UE's network service.

A mobile network, such as a 5G or 3G mobile network provided by a network operator, may enable a UE to access another network, such as the internet. A data network identifier, such as a data network name (DNN) in a 5G network, or access point name (APN) in some other networks such as 3G, may act as a unique identifier for routing traffic to appropriate networks, and may act as a gateway or access point through which a UE accesses the internet (or other network. DNNs and APNs allow for customized network services to be provided to different users and devices. For case of discussion, the examples herein will refer to the data network identifiers as DNNs, although the present disclosure is not limited thereto. A UE may be configured with a DNN, or it may be assigned by the mobile network operator.

Accepted or recognized DNNs may be different between network operators. Accordingly, when a UE subscribed to a home network connects to a visited network, the UE may provide a DNN that the visited network does not recognize or accept. If a UE provides an incompatible DNN, or does not provide a DNN at all, the visited network may supply or substitute a DNN for the UE that is compatible with the visited network. However, the roaming partner network may not implement the same DNN replacement logic as the subscriber's home network. When the visited network contacts the home network for the subscriber or UE, the DNN assigned by the visited network may not be recognized by or compatible with the home network. As a result, the DNN which is included in the SM session create request sent (Home routed) from the visited network to the home session management function (SMF) may not be correct or functional. How the DNN replacement would work for outbound roaming cases has not been clearly defined and enabling or disabling the 3GPP (3rd Generation Partnership Project) DNN replacement feature is left to operator choice. Thus, any solution should take into consideration various roaming scenarios. Accordingly, there exists a need for a solution to reliably set DNNs for use by a home network in various roaming scenarios.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for performing data network name replacement for roaming subscribers. In an embodiment, a security edge protection proxy (SEPP) may comprise one or more processors, and a memory having stored thereon instructions. The instructions, upon execution, may cause the one or more processors to receive a request from a visited network regarding a roaming user equipment (UE) associated with a home network of the SEPP system, determine a local data network name (DNN) compatible with the home network to associate with the UE, add the local DNN to the request, and forward the request to a destination within the home network.

In some embodiments, the SEPP system may determine whether the request is a selected type of request, and add the local DNN to the request when the request is the selected type of request. In an example embodiment, the selected type of request is a network repository function (NRF) discovery request for a session management function (SMF) service, and in another example embodiment the selected type of request is a session management function (SMF) create context request. The SEPP system may further determine whether the request includes a DNN attribute, and forward the request to the destination without adding the local DNN to the request when the request does not include the DNN attribute, or add the local DNN when the request does include the DNN attribute. The SEPP system may determine whether a DNN value of the request matches a local list of DNN values for the home network, and forward the request to the destination without adding the local DNN to the request when the DNN value matches an item from the local list of DNN values, or add the local DNN when the DNN value does not match an item from the local list of DNN values. In some embodiments, the SEPP system may select the local DNN from the local list of DNN values according to a static rule that is not dependent on contents of the request, or the SEPP system may select the local DNN from the local list of DNN values based on other values in the request. According to some embodiments, the SEPP system may replace the DNN value of the request with the local DNN, while in some embodiments, the SEPP system may add the local DNN value as a separate parameter of the request from the DNN value.

In an alternative embodiment, a method may comprise operating an edge proxy system of a mobile network, including receiving a request from a visited network regarding a roaming user equipment (UE) associated with a home network of the edge proxy system, determining a local data network name (DNN) compatible with the home network to associate with the UE, adding the local DNN to the request, and forwarding the request to a destination within the home network.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
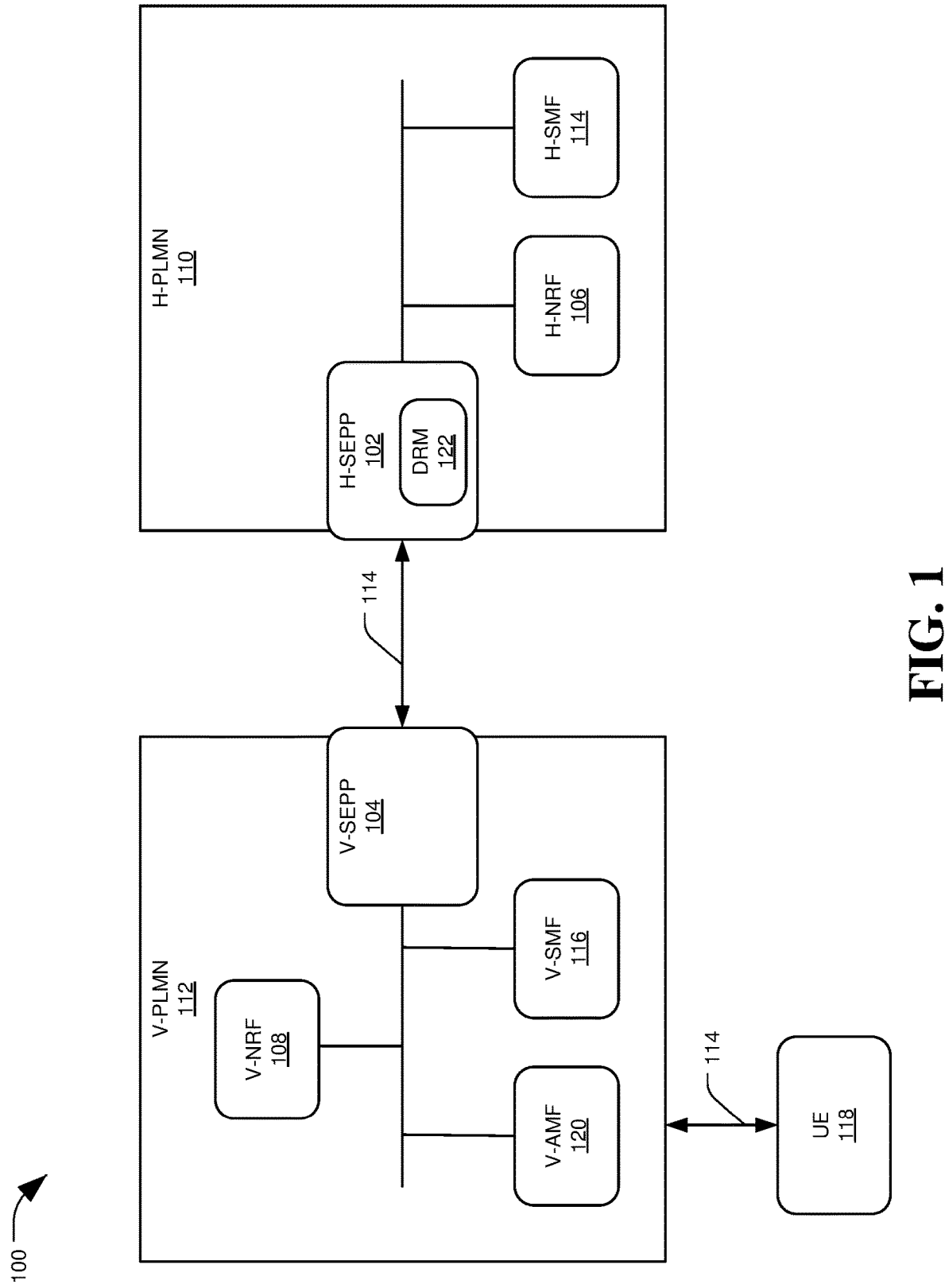
FIG. 1 is a diagram of an operational environment of a system configured to perform data network name replacement for roaming subscribers, in accordance with certain embodiments of the present disclosure.

Some components or operations may be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 is a diagram of a system 100 configured to perform data network name (DNN) replacement for roaming subscribers, in accordance with certain embodiments of the present disclosure. The example system 100 may include 5G mobile networks implementing 3GPP (3rd Generation Partnership Project) communication standards (e.g., using the TS 29.502, TS 29.507, or TS 29.510 technical specifications), although the present disclosure may apply to other communication networks. The system 100 may include a UE 118 connected to a visited public land mobile network (PLMN) 112, which in turn may exchange data with a home PLMN 110. Components of system 100 may communicate via network connectivity components 114.

UE 118 may be a device, system, or module that may utilize the resources of the V-PLMN 112 and H-PLMN 110, such as to establish mobile communications with another UE or to connect to the internet. UE 118 may include mobile devices such as cell phones, tablets, or modems.

Network connectivity components 114 may comprise components that enable communication over communication links, such as network cards, ports, radio frequency (RF) modules, telecommunications channels, cell towers, processing circuitry and software, or other communication components. Network connectivity components 114 may include metallic, wireless, cellular, or optical links, using various communication formats and protocols. In some examples, network connectivity components 114 may simply be referred to as a "network" by which systems or modules are connected or communicate.

V-PLMN 112 and H-PLMN 110 may each include a combination of wireless communication services offered by a specific operator in a specific country (often referred to as a cellular network). Which PLMN is a "home" network or a "visited" network (in which a UE is roaming) may depend upon which network operator a UE or user is subscribed to. Each of V-PLMN 112 and H-PLMN 110 may include a number of network functions (NFs) to provide a resource or functionality to various components and UEs of the wireless network. The NFs may include a network repository function or NF repository function (NRF), such as home-NRF 106 and visited-NRF 108, a session management function (SMF), such as home-SMF 114 and visited-SMF 116, and an access and mobility management function (AMF), such as visited-AMF 120. In addition, each network may include a security edge protection proxy (SEPP), such as home-SEPP 102 and visited-SEPP 104. The components of V-PLMN 112 and H-PLMN 110, or the physical devices implementing them, may be co-located, remotely distributed, or any combination thereof.

Each or any of UE 118, H-NRF 106, V-NRF 108, H-SMF 114, V-SMF 116, V-AMF 120, H-SEPP 102, V-SEPP 104, and network 114 may be implemented via computers, servers, hardware and software modules, or other system components. The elements of system 100 may include components hosted or situated in the cloud, and implemented as software modules potentially distributed across one or more server devices or other physical components.

A network repository function or NF repository function (NRF) 106, 108 may be a monitoring element which includes and maintains a repository of the NF elements of the network, including what services or resources each provides, and potentially metadata provided by the NF. For example, NFs may register with the NRF to provide registration information and metadata for the NF to the NRF for storing in the repository. Once an NF is registered with the NRF, the NRF may provide information regarding the NF in response to discovery requests. For example, an NF may send a discovery request to the NRF regarding an SMF 114, 116 within the network, and the NRF may issue a discovery response providing identifying information and metadata for SMFs in the repository matching the request. A session management function (SMF) 114, 116 may include various functionality relating to subscriber sessions, e.g., session establishment, modification, and release. An access and mobility management function (AMF) 120 may receive all connection and session related information from the UE 118, but may be responsible only for handling connection and mobility management tasks, such as Registration Management, Connection Management, Reachability Management, Mobility Management and various function relating to security and access management and authorization. Other connection and session-related information may be forwarded to other components, such as SMF 114, 116.

A security edge protection proxy (SEPP) 102, 104 may be used to protect control plane traffic that is exchanged between different PLMNs 110, 112. A SEPP may perform message filtering, policing, and topology hiding for all API (application program interface) messages. Messages between SEPPs may be sent via an N32 interface (e.g., N32-C or N32-F), which may be an inter-PLMN interface standard. The transmissions may use a transport layer security (TLS) connection and may therefore be encrypted. A SEPP may use a different TLS connection to send messages to elements of its own network.

A SEPP may decrypt messages after receipt and before transmission, and may be situated to evaluate a DNN specified in messages exchanged between PLMNs 110, 112. Accordingly, the H-SEPP 102 may be configured to evaluate messages received from V-PLMN 112 for DNN data that is not compliant with the H-PLMN 110, and replace the provided DNN value or add a new DNN value that is compliant before forwarding the message to a component within the H-PLMN 110. For example, the H-SEPP 102 may intercept a request from the V-PLMN 112 to the H-NRF 106 regarding information on the H-SMF 114, and an SMF service request from V-PLMN 112 to H-SMF 114, and in both instances may modify the included DNN value. This may provide flexibility for the home operator of H-PLMN 110 to counteract any DNNs which are not understood by the home network by overwriting the DNN value. This may also enable flexibility in allowing the visited/home network functions to be agnostic of home/visited DNNs, as each home network may set compatible DNNs without regard to DNN values set by visited networks. The home operator may have the entire control of DNN values within the H-PLMN 110, ensuring that the DNN replacement is enforced. One or more operations of intercepting inter-PLMN messages, evaluating the DNN values in the messages, and replacing or adding compatible DNN values may be performed by one or more DNN replacement modules (DRMs) 122 within H-SEPP 102. The implementation of DNN replacement for roaming subscribers is discussed further in regard to FIGS. 2-6.

Figure 2:
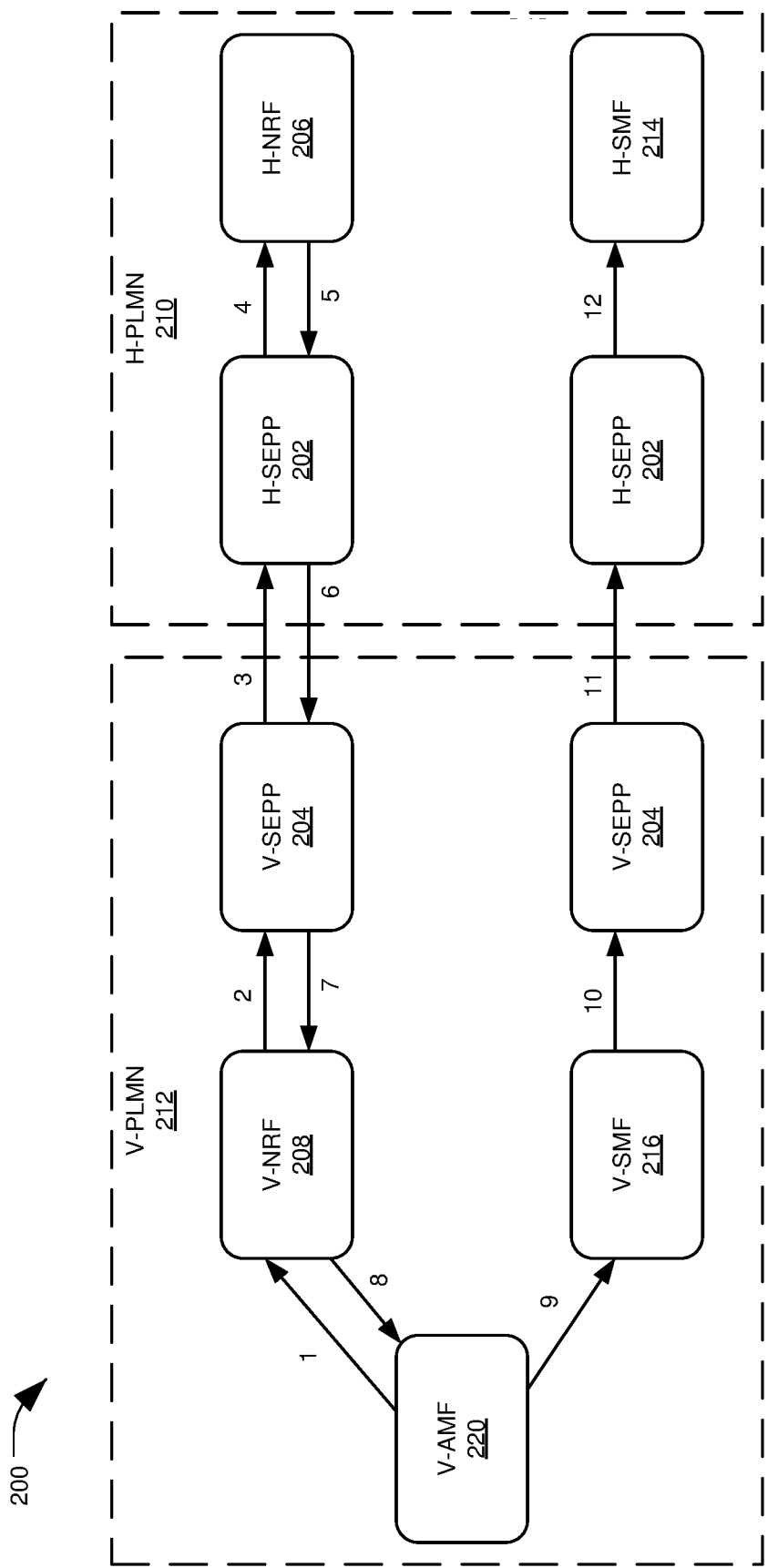
FIG. 2 is a diagram of a system configured to perform data network name replacement for roaming subscribers, in accordance with certain embodiments of the present disclosure.

FIG. 2 is a diagram 200 of a system configured to perform DNN replacement for roaming subscribers, in accordance with certain embodiments of the present disclosure. In particular, FIG. 2 may illustrate a process flow by which a security edge protection proxy (SEPP) may modify DNN values in messages from a partner roaming network to a home network. The diagram 200 may include a V-PLMN 212 including a V-AMF 220, a V-NRF 208, a V-SMF 216, and a V-SEPP 204, and an H-PLMN 210 including an H-SEPP 202, an H-NRF 206, and an H-SMF 214. The components of diagram 200 may correspond to the components discussed in regard to FIG. 1.

As discussed herein, the visited access and mobility management function (V-AMF) 220 may receive a session establishment request from a UE, such as protocol data unit (PDU) session request. The request may include a DNN provided by the UE. A PDU session may be associated with a single DNN and a single-network slice selection assistance information (S-NSSAI). In response to the session establishment request, the V-AMF 220 may assign a DNN for the visited network (if no DNN was provided by the UE), or in some embodiments may replace a DNN provided by the UE for the session, and then may issue a session management function (SMF) discovery request to a network repository function of the visited network (V-NRF) 208, via message 1.

The V-NRF 208 may determine that the UE involved in the PDU session request is associated with a home network, and may therefore send an SMF discovery request to the home network (see, e.g., TS 23.502 Red 16.9, section 4.3.2.2.3.3) via message 2 to the visited network's SEPP (V-SEPP) 204. The V-SEPP 204 may forward the request (e.g., after applying appropriate encryption) to the SEPP of the home network (H-SEPP 202) via message 3.

The H-SEPP 202 (e.g., via a DNN replacement module 122) may examine the message 3 to determine it include an SMF discovery request, and that DNN replacement logic should be applied. The DNN replacement logic may include the H-SEPP 202 comparing a DNN value included in the SMF discovery request against one or more DNNs that are compatible or recognized by the home network. If the DNN from the SMF discovery request does not match the selected DNNs for the home network, the H-SEPP 202 may replace the DNN value or add a new DNN value from the home list to the SMF discovery request, before forwarding the request to the H-NRF 206, via message 4.

The H-NRF 206 may receive the SMF discovery request, and may select an SMF (e.g., H-SMF 214) based on the local DNN value supplied by the H-SEPP 202. The H-NRF 206 may then return an SMF discovery response to the visited network via the H-SEPP 202, in message 5. The H-SEPP 202 may send the SMF discovery response to the visited network through V-SEPP 204 and message 6. No information regarding the replaced DNN may be sent to the visited network. The SMF discovery response may be forwarded from the V-SEPP 204 to the V-NRF 208 via message 7, and from the V-NRF 208 to the V-AMF 220 via message 8.

The V-AMF 220 may be unaware of the DNN replacement performed by the H-SEPP 202, nor of the H-SMF 214 selection based on the replaced DNN. Based on the discovery response received via message 8, the V-AMF 220 may send a PDU session create request, with the visited network DNN, to V-SMF 216 via message 9.

The V-SMF 216 may receive the message 9, and in response may issue an SMF service create request (e.g., an Nsmf_PDUSession Service request, such as a Create SM Context message, TS 29.502-5.2.2.2, or a Create service operation, TS 29.502-5.2.2.7) towards the H-SMF 214, with the request including the DNN from the visited network. The service create request may be sent to V-SEPP 204 via message 10, and forwarded to H-SEPP 202 via message 11.

The H-SEPP 202 may determine whether the received message 11 includes an SMF Create Context request, and if so, whether it includes a DNN attribute. If the request includes the DNN attribute, the H-SEPP 202 may apply DNN replacement logic, as described herein, and send the request with the home network-compatible DNN to the H-SMF, at 214. The H-SMF 214 may then perform further processing using the local DNN value.

When the H-SEPP 202 identifies a selected type of command or request that may include a DNN value from a visited or roaming network, it may determine whether a local DNN value needs to be added to the message, or replace a DNN value in the message. For example, if the message includes a DNN parameter, the H-SEPP 202 may replace the value of the parameter with a DNN from a recognized or accepted list for the home network, or add the local DNN as a value for a different parameter. For example, an NRF discovery request may only have a query parameter for "Dnn" which needs to be set to a specific value, and so the H-SEPP 202 may replace the DNN parameter value from the visited network with a DNN value from the home network. Meanwhile, in an SMF service request, there may be a specific attribute or parameter for "Dnn" which is requested by the UE or added by AMF, and then there may be another attribute or parameter in the request for "selectedDnn". Therefore the H-SEPP 202 may leave the visited DNN value in the message with the "Dnn" parameter, but add a local DNN value to the "selectedDnn" parameter. By keeping the Dnn parameter unchanged and adding a different value for "selectedDnn", it would let H-SMF 214 know that the UE requested or visited network DNN is different from the DNN to be used by the home network. Another example diagram of a system for DNN replacement is depicted in FIG. 3.

Figure 3:
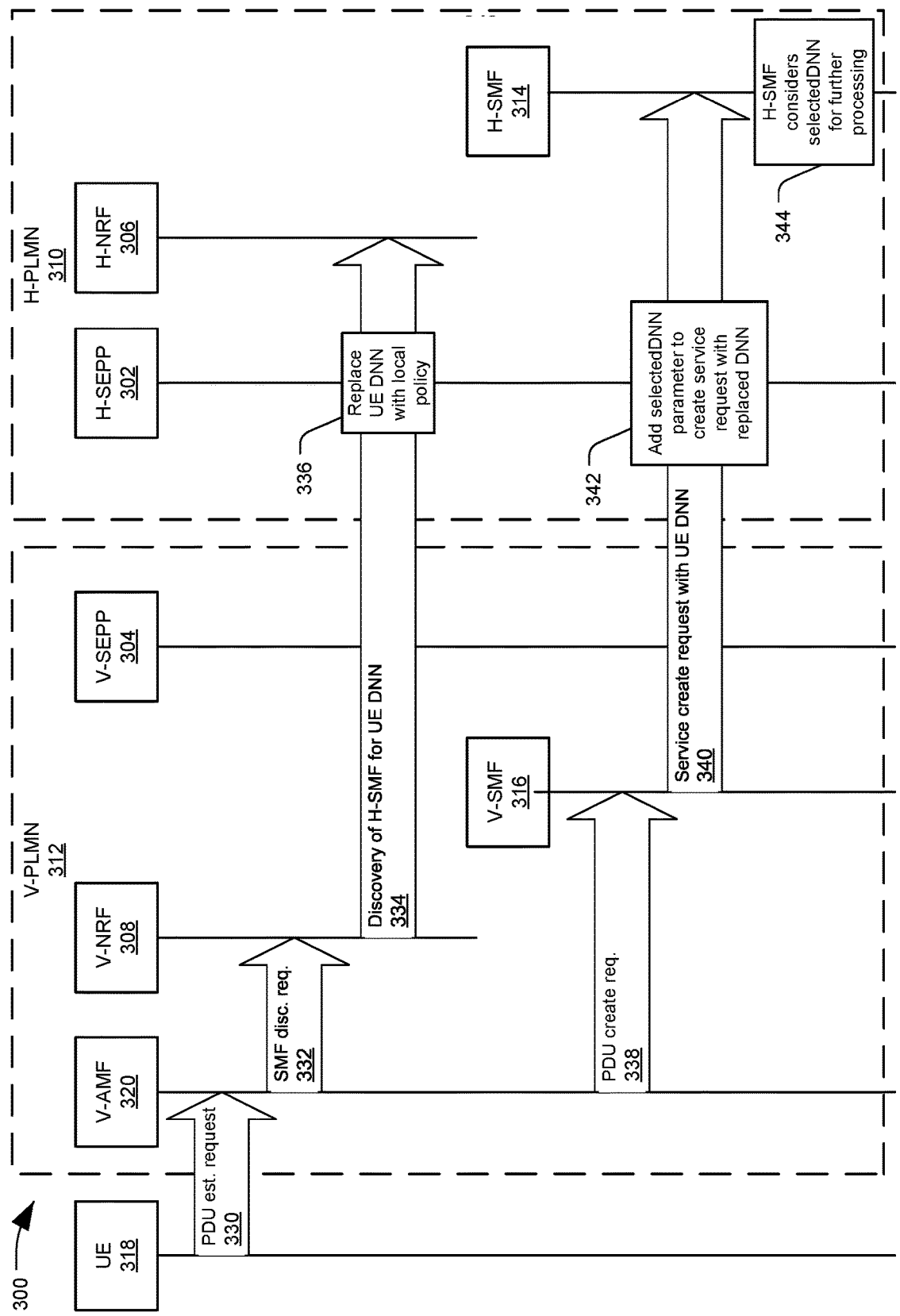
FIG. 3 is a diagram of a system configured to perform data network name replacement for roaming subscribers, in accordance with certain embodiments of the present disclosure.

FIG. 3 is a diagram 300 of a system configured to perform DNN replacement for roaming subscribers, in accordance with certain embodiments of the present disclosure. In particular, FIG. 3 may illustrate a process flow by which a security edge protection proxy (SEPP) may modify DNN values in messages from a partner roaming network to a home network. The diagram 300 may include a UE 306, a V-PLMN 312 including a V-AMF 320, a V-NRF 308, a V-SMF 316, and a V-SEPP 304, and an H-PLMN 310 including an H-SEPP 302, an H-NRF 306, and an H-SMF 314. The components of diagram 300 may correspond to the components discussed in regard to FIGS. 1 and 2.

UE 318 may attempt to connect to a network by issuing a PDU session establishment request 330. When in a region services by a visited or roaming network V-PLMN 312, the PDU session establishment request 330 may be received by V-AMF 320. The PDU session establishment request 330 may include information such as a default DNN, information identifying the H-PLMN 310 to which the UE 318 is subscribed, or other details. If no default DNN is specified or requested by the UE 318, or if the DNN provided by the UE is not recognized or supported by the V-PLMN 312 (e.g., is not in the subscribed DNN list for the UE in the V-PLMN), the V-AMF 320 may assign a DNN supported by the V-PLMN (sec, e.g., TS 23.502, Section 4.3.2.2.2).

In response to the PDU session establishment request, the V-AMF 320 may send an SMF discovery request to V-NRF 308. Upon determining the request corresponds to a roaming UE 318, the V-NRF 308 may issue a discovery request 334 for the H-SMF 314 to the H-NRF 306, the request including the DNN assigned by the V-PLMN 312 for the UE 318. The H-SMF discovery request 334 may be passed through the V-SEPP 304 to H-SEPP 302.

H-SEPP 302 may analyze incoming messages from V-SEPP 304 to determine if the message falls within certain categories, includes a DNN value assigned by the V-PLMN 312, or both. When a message meets the specified criteria, the H-SEPP 302 may apply DNN replacement logic 336, including replacing the DNN assigned to the UE with a DNN according to a local policy of the H-PLMN 310, or adding a new DNN value. The H-SEPP 302 may then forward the H-SMF discovery request with the local DNN to H-NRF 306.

H-NRF 306 may process the H-SMF discovery request based on the local DNN value, and return details of the H-SMF 314 in response. The response may be returned via H-SEPP 302 and V-SEPP 304 to V-AMF 320. The V-AMF 320 in turn may issue a PDU session creation request 338 to V-SMF 316, with the request including the H-SMF 314 data received from H-NRF 306 and the DNN assigned by the V-AMF 320 or requested by the UE 318. Based on the PDU session creation request, the V-SMF 316 may issue a service create request 340 with the V-PLMN 312 DNN to the H-SMF 314 via the V-SEPP 304 and H-SEPP 302.

H-SEPP 302 may evaluate the service create request 340, and apply DNN replacement logic to the request. For example, the H-SEPP 302 may add a "selectedDnn" parameter to the create service request with a local DNN value, at 342. The local DNN value may be the same value assigned at operation 336, or in some examples may be a different DNN recognized within H-PLMN 310. The service create request 340 with the local DNN value may be forwarded to H-SMF 314, which may process the request based on the local DNN value (e.g., in a selectedDnn parameter) for further processing, at 344. The H-SMF 314 may return a response to the V-PLMN 312 (e.g., to V-SMF 316) via H-SEPP 302 and V-SEPP 304.

Although the examples provided herein reflect a 5G-network-to-5G network exchange between visited and home network, the principles discussed in this disclosure are not limited to such embodiments. For example, for an EPS (evolved packet system) to 5G handover/Idle-Mobility transition and vice-versa, the APN (instead of DNN) replacement logic may be performed for home-routed traffic (HRT) in EPS by a node or edge proxy in the home network, such as an MME (mobility management entity), rather than by an H-SEPP. Likewise in 4G, this functionality may be performed by an edge proxy node. Accordingly, 5G-specific terminology used in the specification and claims are intended to cover corresponding elements from networks using other communications protocols, such as DNN including APN, and SEPP including MME or other edge or proxy nodes within a home network. Examples of DNN replacement logic applied by H-SEPP 302 are described in regard to FIGS. 4-5.

Figure 4:
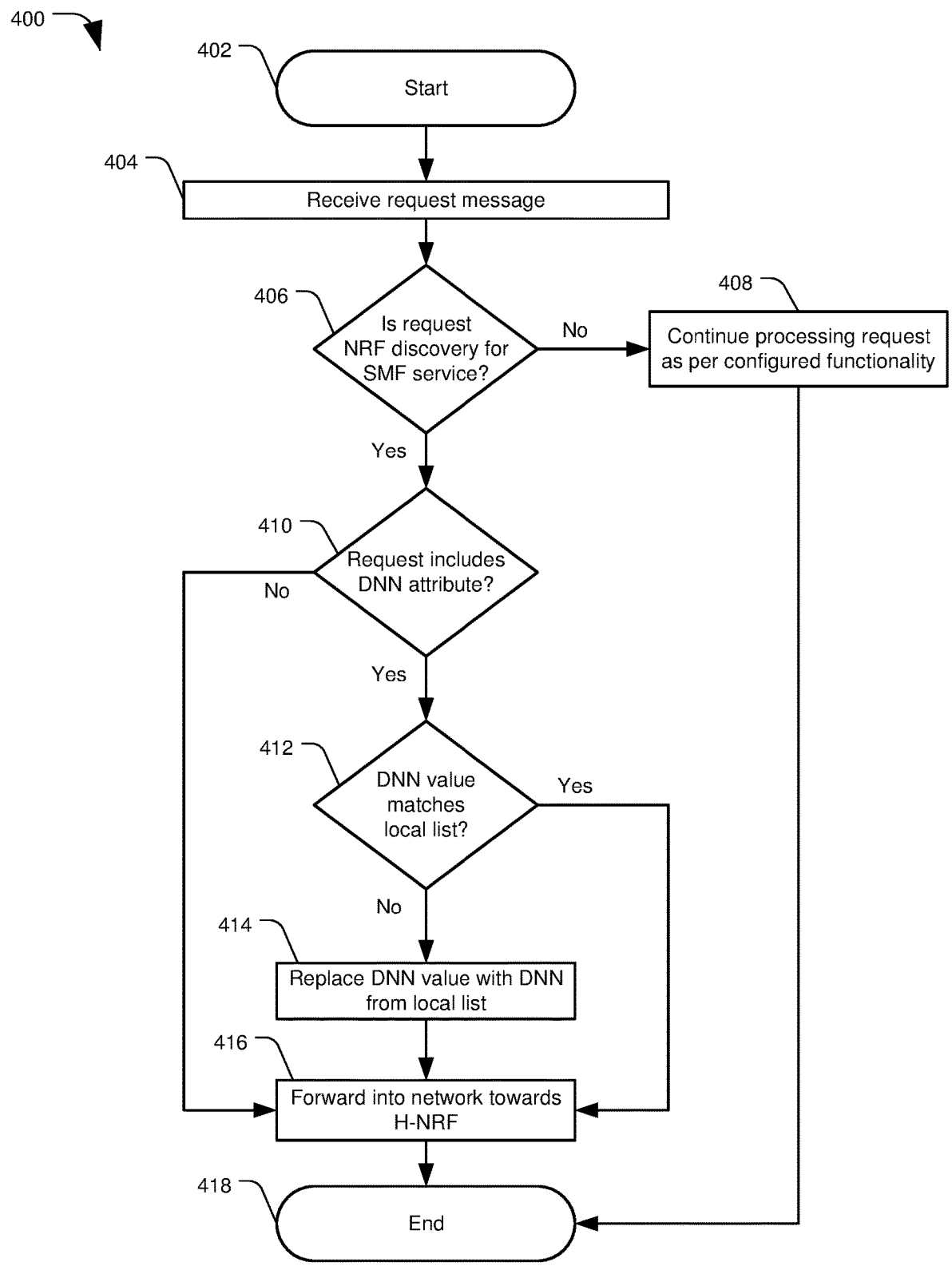
FIG. 4 depicts a flowchart of an example method to perform data network name replacement for roaming subscribers, in accordance with certain embodiments of the present disclosure.

FIG. 4 depicts a flowchart 400 of an example method to perform DNN replacement for roaming subscribers, in accordance with certain embodiments of the present disclosure. In particular, the method of FIG. 4 depicts an example process for replacing DNN values within a NRF discovery request for SMF service, such as messages 1-4 of FIG. 2 or message 334 of FIG. 3. The method may be applied by a SEPP of a home network or H-PLMN, such as H-SEPP of FIGS. 1-3 or DNN replacement module (DRM) 122 of FIG. 1.

The method may start at 402, and then may include receiving a request message, at 404. The request message may be received at a home SEPP (H-SEPP) from a SEPP of a partner roaming network (V-SEPP). The method may include determining whether the request is an NRF discovery request for an SMF service, at 406. An NRF discovery request may be a query to an NRF to obtain information about another NF; in this case, an SMF. If the request is not an NRF discovery request for an SMF service, the method may include processing the request as per configured or default functionality, at 408. For example, the request may be forwarded to its intended destination NF without modification by the H-SEPP. The method may then end, at 418.

When the request is an NRF discovery request for an SMF service, the method may include determining whether the request includes a DNN attribute, or has a value for a DNN parameter, at 410. If not, the method may include forwarding the request into the home network toward the H-NRF, at 416. However, if the request does include a DNN attribute, the method may include determining whether the DNN value matches a local list, at 412. For example, the H-SEPP may store or have access to a list of DNN values recognized or accepted by the home network. The H-SEPP may compare the DNN value from the NRF discovery request against the local list to determine whether there is a match between them. If not, the method may include replacing the DNN value with a DNN value from the local list, at 414. Which DNN to use from the local list may be selected by a static rule that is not dependent on the contents of the request (e.g., apply the same DNN value for all calls from a visited network), or may be different based on other values in the request.

When the DNN value does match the local list, or after replacing the DNN value with a DNN from the local list, at 414, the method may include forwarding the request into the network toward the H-NRF, at 416. The method may then end, at 418.

Figure 5:
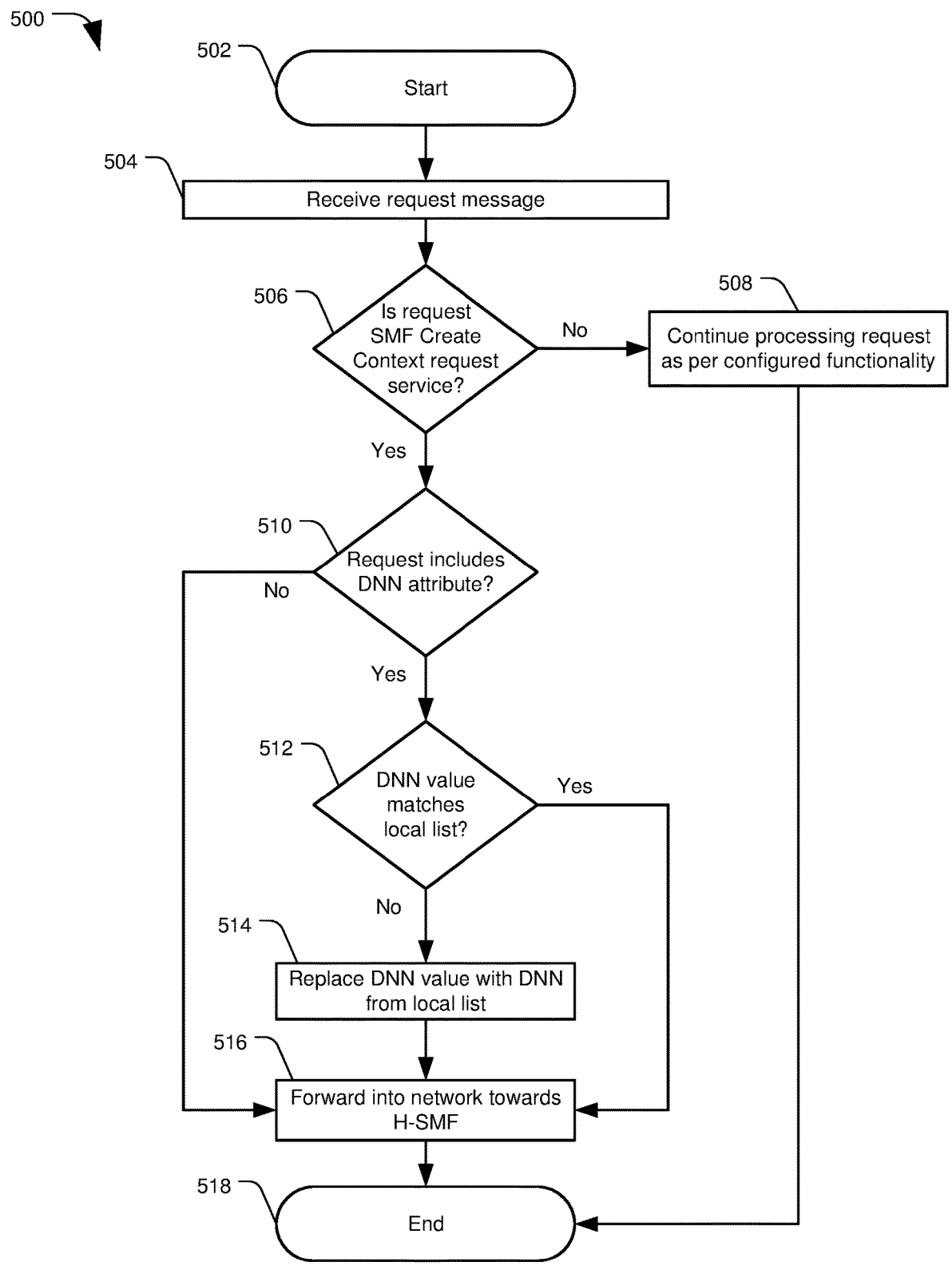
FIG. 5 depicts a flowchart of an example method to perform data network name replacement for roaming subscribers, in accordance with certain embodiments of the present disclosure.

Turning now to FIG. 5, a flowchart 500 of an example method to perform DNN replacement for roaming subscribers is depicted, in accordance with certain embodiments of the present disclosure. In particular, the method of FIG. 5 depicts an example process for replacing DNN values within an SMF Create Context request service message, such as messages 9-12 of FIG. 2 or message 340 of FIG. 3. The method may be applied by a SEPP of a home network or H-PLMN, such as H-SEPP of FIGS. 1-3 or DNN replacement module (DRM) 122 of FIG. 1.

The method may start at 502, and then may include receiving a request message, at 504. The request message may be received at a home SEPP (H-SEPP) from a SEPP of a partner roaming network (V-SEPP). The method may include determining whether the request is an SMF Create Context request service message, at 506. An SMF Create Context request service message may be a request to an H-SMF to establish service for a roaming UE using the roaming partner network. If the request is not an SMF Create Context request service message, the method may include processing the request as per configured or default functionality, at 508. For example, the request may be forwarded to its intended destination NF without modification by the H-SEPP. The method may then end, at 518.

When the request is an SMF Create Context request service message, the method may include determining whether the request includes a DNN attribute, or has a value for a DNN parameter, at 510. If not, the method may include forwarding the request into the home network toward the H-SMF, at 516. However, if the request does include a DNN attribute, the method may include determining whether the DNN value matches a local list, at 512. For example, the H-SEPP may store or have access to a list of DNN values recognized or accepted by the home network. The H-SEPP may compare the DNN value from the SMF Create Context request against the local list to determine whether there is a match between them. If not, the method may include replacing the DNN value with a DNN value from the local list, at 514. Which DNN to use from the local list may be selected by a static rule (e.g., apply the same DNN value for all calls from a visited network), or may be different based on other values in the request.

When the DNN value does match the local list, or after replacing the DNN value with a DNN from the local list, at 514, the method may include forwarding the request into the network toward the H-SMF, at 516. The method may then end, at 518. A computing system configured to perform the operations of the methods of FIGS. 4-5 is described in regard to FIG. 6.

Figure 6:
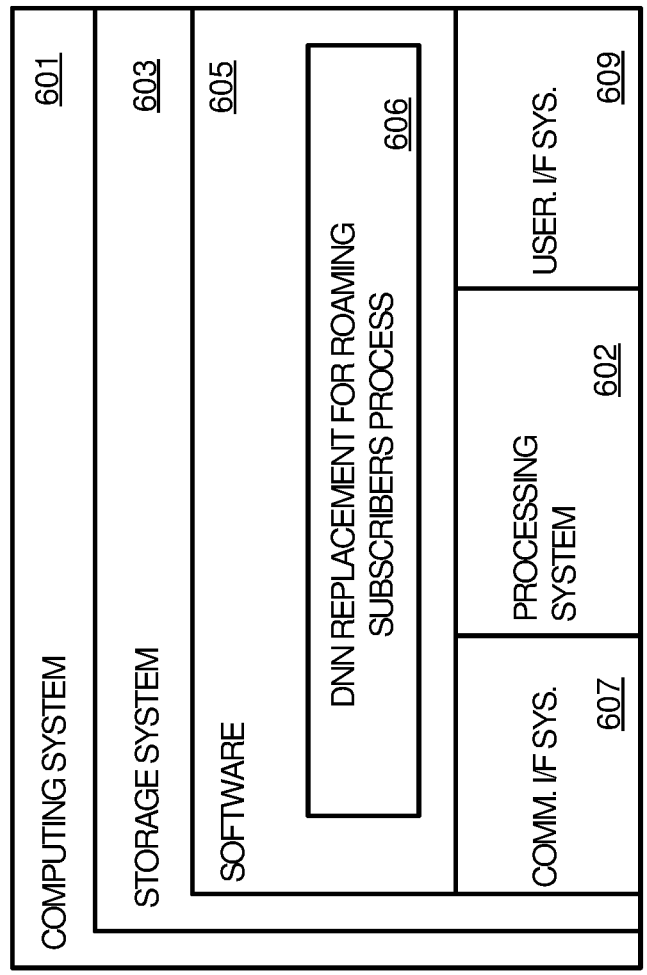
FIG. 6 illustrates a computing system configured to perform data network name replacement for roaming subscribers, in accordance with some embodiments of the present technology.

FIG. 6 illustrates an apparatus 600 including a computing system 601 that is representative of any system or collection of systems in which the various processes, systems, programs, services, and scenarios disclosed herein may be implemented. For example, computing system 601 may be an example of UE 118, V-NRF 108, V-SMF 116, V-AMF 120, V-SEPP 104, H-SEPP 102, DRM 122, H-NRF 106, or H-SMF 114 of FIG. 1. Examples of computing system 601 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 601 may be implemented as a single apparatus, system, or device or may be implemented in a distributed manner as multiple apparatuses, systems, or devices. Computing system 601 may include, but is not limited to, processing system 602, storage system 603, software 605, communication interface system 607, and user interface system 609. Processing system 602 may be operatively coupled with storage system 603, communication interface system 607, and user interface system 609.

Processing system 602 may load and execute software 605 from storage system 603. Software 605 may include and implement a DNN replacement for roaming subscribers process 606, which may be representative of any of the operations for determining whether to replace or add a local DNN value to a message from a partner roaming network, and implementing the DNN replacement discussed with respect to the preceding figures. When executed by processing system 602 to determine and implement a DNN replacement operation, software 605 may direct processing system 602 to operate as described herein for at least the various processes, operational scenarios, and sequences discussed in the foregoing implementations. Computing system 601 may optionally include additional devices, features, or functionality not discussed for purposes of brevity.

In some embodiments, processing system 602 may comprise a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 may include general purpose central processing units, graphical processing units, application specific processors, and logic devices, as well as any other type of processing device, combinations, or variations thereof.

Storage system 603 may comprise any memory device or computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including DNN replacement for roaming subscribers process 1006 among other functions) may be implemented in program instructions that may, when executed by processing system 602, direct processing system 602 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to implement the systems and processes as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

While some examples provided herein are described in the context of 5G communication networks operated in a cloud environment, it should be understood the systems and methods described herein are not limited to such embodiments, and may apply to a variety of other communication networks and resource discovery request environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise." "comprising." "including," and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. Except when used for the selection or determination between alternatives, the word "or" in reference to a list of two or more items covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A security edge protection proxy (SEPP) system, comprising:
   one or more processors; and
   a memory having stored thereon instructions that, upon execution by the one or more processors, cause the one or more processors to:
      receive a request from a visited network regarding a roaming user equipment (UE) associated with a home network of the SEPP system;
      determine a local data network name (DNN) compatible with the home network to associate with the UE;
      add the local DNN to the request; and
      forward the request to a destination within the home network.

2. The SEPP system of claim 1, further comprising instructions that, upon execution, cause the one or more processors to:
   determine whether the request is a selected type of request; and
   add the local DNN to the request when the request is the selected type of request.

3. The SEPP system of claim 2, further comprising the selected type of request is a network repository function (NRF) discovery request for a session management function (SMF) service.

4. The SEPP system of claim 2, further comprising the selected type of request is a session management function (SMF) create context request.

5. The SEPP system of claim 2, further comprising instructions that, upon execution, cause the one or more processors to:
   determine whether the request includes a DNN attribute;
   forward the request to the destination without adding the local DNN to the request when the request does not include the DNN attribute; and
   add the local DNN when the request does include the DNN attribute.

6. The SEPP system of claim 5, further comprising instructions that, upon execution, cause the one or more processors to:
   determine whether a DNN value of the request matches a local list of DNN values for the home network;
   forward the request to the destination without adding the local DNN to the request when the DNN value matches an item from the local list of DNN values; and
   add the local DNN when the DNN value does not match an item from the local list of DNN values.

7. The SEPP system of claim 6, further comprising instructions that, upon execution, cause the one or more processors to:

select the local DNN from the local list of DNN values according to a static rule that is not dependent on contents of the request.

8. The SEPP system of claim 6, further comprising instructions that, upon execution, cause the one or more processors to:
select the local DNN from the local list of DNN values based on other values in the request.

9. The SEPP system of claim 6, further comprising instructions that, upon execution, cause the one or more processors to:
add the local DNN to the request, further including:
replace the DNN value of the request with the local DNN.

10. The SEPP system of claim 6, further comprising instructions that, upon execution, cause the one or more processors to:
add the local DNN to the request, further including:
add the local DNN as a separate parameter of the request from the DNN value.

11. A method comprising:
operating an edge proxy system of a mobile network, including:
receiving a request from a visited network regarding a roaming user equipment (UE) associated with a home network of the edge proxy system;
determining a local data network name (DNN) compatible with the home network to associate with the UE;
adding the local DNN to the request; and
forwarding the request to a destination within the home network.

12. The method of claim 11, further comprising:
determining whether the request is a selected type of request; and
adding the local DNN to the request when the request is the selected type of request.

13. The method of claim 12, further comprising the selected type of request is a network repository function (NRF) discovery request for a session management function (SMF) service.

14. The method of claim 12, further comprising the selected type of request is a session management function (SMF) create context request.

15. The method of claim 11, further comprising:
determining whether the request includes a DNN attribute;
forwarding the request to the destination without adding the local DNN to the request when the request does not include the DNN attribute; and
adding the local DNN when the request does include the DNN attribute.

16. The method of claim 11, further comprising:
determining whether a DNN value of the request matches a local list of DNN values for the home network;
forwarding the request to the destination without adding the local DNN to the request when the DNN value matches an item from the local list of DNN values; and
adding the local DNN when the DNN value does not match an item from the local list of DNN values.

17. The method of claim 11, further comprising:
selecting the local DNN from a local list of DNN values for the home network according to a static rule that is not dependent on contents of the request.

18. The method of claim 11, further comprising:
selecting the local DNN from a local list of DNN values for the home network based on other values in the request.

19. The method of claim 11, further comprising:
adding the local DNN to the request, further including replacing a DNN value of the request with the local DNN.

20. The method of claim 11, further comprising:
adding the local DNN to the request, further including adding the local DNN as a separate parameter of the request from a DNN value included in the request when received from the visited network.

* * * * *